(12) United States Patent
Li

(10) Patent No.: US 10,012,243 B2
(45) Date of Patent: Jul. 3, 2018

(54) PNEUMATIC MECHANISM

(71) Applicant: GISON MACHINERY CO., LTD., Taichung (TW)

(72) Inventor: Kuang-Tai Li, Taichung (TW)

(73) Assignee: GISON MACHINERY CO., LTD., Taichung (TW)

( * ) Notice: Subject to any disclaimer, the term of this patent is extended or adjusted under 35 U.S.C. 154(b) by 768 days.

(21) Appl. No.: 14/562,177

(22) Filed: Dec. 5, 2014

(65) Prior Publication Data

US 2016/0108932 A1 Apr. 21, 2016

(30) Foreign Application Priority Data

Oct. 16, 2014 (TW) .............................. 103135849 A

(51) Int. Cl.
| | |
|---|---|
| *B23B 47/08* | (2006.01) |
| *B23B 45/14* | (2006.01) |
| *F04F 5/18* | (2006.01) |
| *B25H 1/00* | (2006.01) |
| *B23B 51/06* | (2006.01) |

(52) U.S. Cl.
CPC ............. *F04F 5/18* (2013.01); *B25H 1/0021* (2013.01); *B25H 1/0057* (2013.01); *B23B 51/06* (2013.01); *B23B 2260/118* (2013.01); *B25H 1/0064* (2013.01)

(58) Field of Classification Search
CPC .. B25H 1/0064; B25H 1/0057; B25H 1/0021; B23B 2260/118; B23B 47/08; B23B 45/14; Y10T 408/554; Y10T 408/5628; Y10T 408/46; Y10T 408/5647; Y10T 408/65

See application file for complete search history.

(56) References Cited

U.S. PATENT DOCUMENTS

| | | | | |
|---|---|---|---|---|
| 1,317,285 | A * | 9/1919 | Glaude ................... | B23B 47/28 408/97 |
| 1,946,214 | A * | 2/1934 | Kabigting ............ | B25H 1/0071 29/DIG. 95 |
| 2,151,205 | A * | 3/1939 | Hawn ................. | B23B 51/0426 408/110 |
| 2,719,461 | A * | 10/1955 | Hawker ................. | B23B 41/00 408/111 |
| 2,750,816 | A * | 6/1956 | Mott ....................... | B23B 45/04 173/153 |
| 2,881,589 | A * | 4/1959 | Hitt ......................... | B23B 45/04 173/158 |

(Continued)

*Primary Examiner* — Ryan Rufo
(74) *Attorney, Agent, or Firm* — Guice Patents PLLC

(57) ABSTRACT

A pneumatic mechanism includes: a casing having a main body and a base seat; a drive mechanism disposed in the main body; a first air bypass disposed in the main body, a rear end of the first air bypass communicating with the drive mechanism; a second air bypass having a rear end positioned on the base seat; at least one airflow passage disposed on the base seat, one end of which communicating with the second air bypass; at least one sucker disposed on the base seat; and at least one air-sucking passage disposed between the base seat and the sucker. One end of the air-sucking passage communicates with the air chamber of the sucker, the other end communicates with the airflow passage. The pneumatic mechanism is powered by one single power source to operate and produce sucking force.

16 Claims, 16 Drawing Sheets

(56) References Cited

U.S. PATENT DOCUMENTS

| | | | | | |
|---|---|---|---|---|---|
| 2,909,949 | A | * | 10/1959 | Winslow | B23B 51/0054 408/10 |
| 2,910,895 | A | * | 11/1959 | Winslow | B25B 11/007 269/21 |
| 4,582,460 | A | * | 4/1986 | Silverberg | B25H 1/0064 408/76 |
| 4,932,814 | A | * | 6/1990 | York | B23B 29/02 29/26 B |
| 5,277,524 | A | * | 1/1994 | Chung | B23B 39/162 408/111 |
| 5,807,034 | A | * | 9/1998 | Perlmutter | B25B 11/007 408/67 |
| 5,890,848 | A | * | 4/1999 | Kachich | B23Q 11/10 408/1 R |
| 6,007,278 | A | * | 12/1999 | Arsenault | B23B 41/10 408/102 |
| 6,296,426 | B1 | * | 10/2001 | King | B23B 49/026 408/76 |
| 6,413,022 | B1 | * | 7/2002 | Sarh | B21J 15/10 408/16 |
| 6,472,676 | B1 | * | 10/2002 | Douglas | G05B 19/401 250/208.1 |
| 7,108,459 | B1 | * | 9/2006 | Mueller | B23B 39/00 408/1 R |
| 7,520,702 | B2 | * | 4/2009 | Wiehler | B23B 39/00 408/132 |
| 2005/0132560 | A1 | * | 6/2005 | Jones | B23Q 9/0014 29/559 |
| 2011/0002751 | A1 | * | 1/2011 | Katzenberger | B21J 15/10 408/241 G |
| 2015/0056034 | A1 | * | 2/2015 | Anson | B23B 49/026 408/115 B |

* cited by examiner

PNEUMATIC MECHANISM

BACKGROUND OF THE INVENTION

1. Field of the Invention

The present invention relates generally to a pneumatic mechanism, and more particularly to a pneumatic mechanism, which is powered by a high-pressure air source as the only power source of the pneumatic mechanism.

2. Description of the Related Art

Power mechanisms can be classified into two types, that is, electrical mechanism and pneumatic mechanism. For example, various power mechanisms or power tools such as grinding machines, punchers and punching tools can be electrically powered or pneumatically powered. With a handheld driller taken as an example, the driller is used to drill holes on a wall. An operator must hold the driller to perform the drilling operation. However, the weight of the driller is a burden to the operator. The user can hardly securely hold the power mechanism with both hands and it is quite dangerous for the user to operate the power mechanism. It is therefore tried by the applicant to provide a power mechanism, which can produce sucking force to suck the wall face so as to eliminate the burden to a user caused by the weight of the power mechanism. Accordingly, the security in use of the pneumatic mechanism can be enhanced.

SUMMARY OF THE INVENTION

It is therefore a primary object of the present invention to provide a pneumatic mechanism, which can produce sucking force to suck a plane face. Accordingly, in operation, the pneumatic mechanism can suck and attach to the plane face, whereby it is no more necessary for a user to bear the weight of the pneumatic mechanism. In this case, the security in use of the pneumatic mechanism is enhanced.

It is a further object of the present invention to provide the above pneumatic mechanism, which is powered by a high-pressure air source to both operate and produce sucking force.

It is still a further object of the present invention to provide the above pneumatic mechanism, which can provide liquid lubrication, cooling and powder wetting effect.

The pneumatic mechanism of the present invention includes:
- a casing having a main body and a base seat;
- a drive mechanism disposed in the main body;
- a first air bypass and a second air bypass disposed in the main body, a rear end of the first air bypass communicating with the drive mechanism, a rear end of the second air bypass being positioned on the base seat;
- at least one airflow passage disposed on the base seat, one end of the airflow passage communicating with the second air bypass;
- at least one sucker disposed on an end face of the base seat, the sucker having an annular wall defining an air chamber; and
- at least one air-sucking passage disposed between the base seat and the sucker, one end of the air-sucking passage communicating with the air chamber of the sucker, the other end of the air-sucking passage communicating with the airflow passage.

According to the above arrangement, the pneumatic mechanism is only powered by one single power source to operate and produce sucking force. In operation of the pneumatic mechanism, the pneumatic mechanism produces sucking force to suck a surface. Therefore, the burden to a user caused by the weight of the pneumatic mechanism is eliminated to stabilize the operation and enhance the processing precision. Moreover, since the operator does not need to bear the weight of the pneumatic mechanism, the strength of the operator is saved and the security in use of the pneumatic mechanism is enhanced.

In addition, the high-pressure air source serves as the power source of the pneumatic mechanism of the present invention. Therefore, the danger of shock can be avoided. Furthermore, the pneumatic mechanism of the present invention can discharge a fluid to provide lubrication and cooling effect and wet the processing powders.

The present invention can be best understood through the following description and accompanying drawings, wherein:

DETAILED DESCRIPTION OF THE PREFERRED EMBODIMENTS

Figure 1:
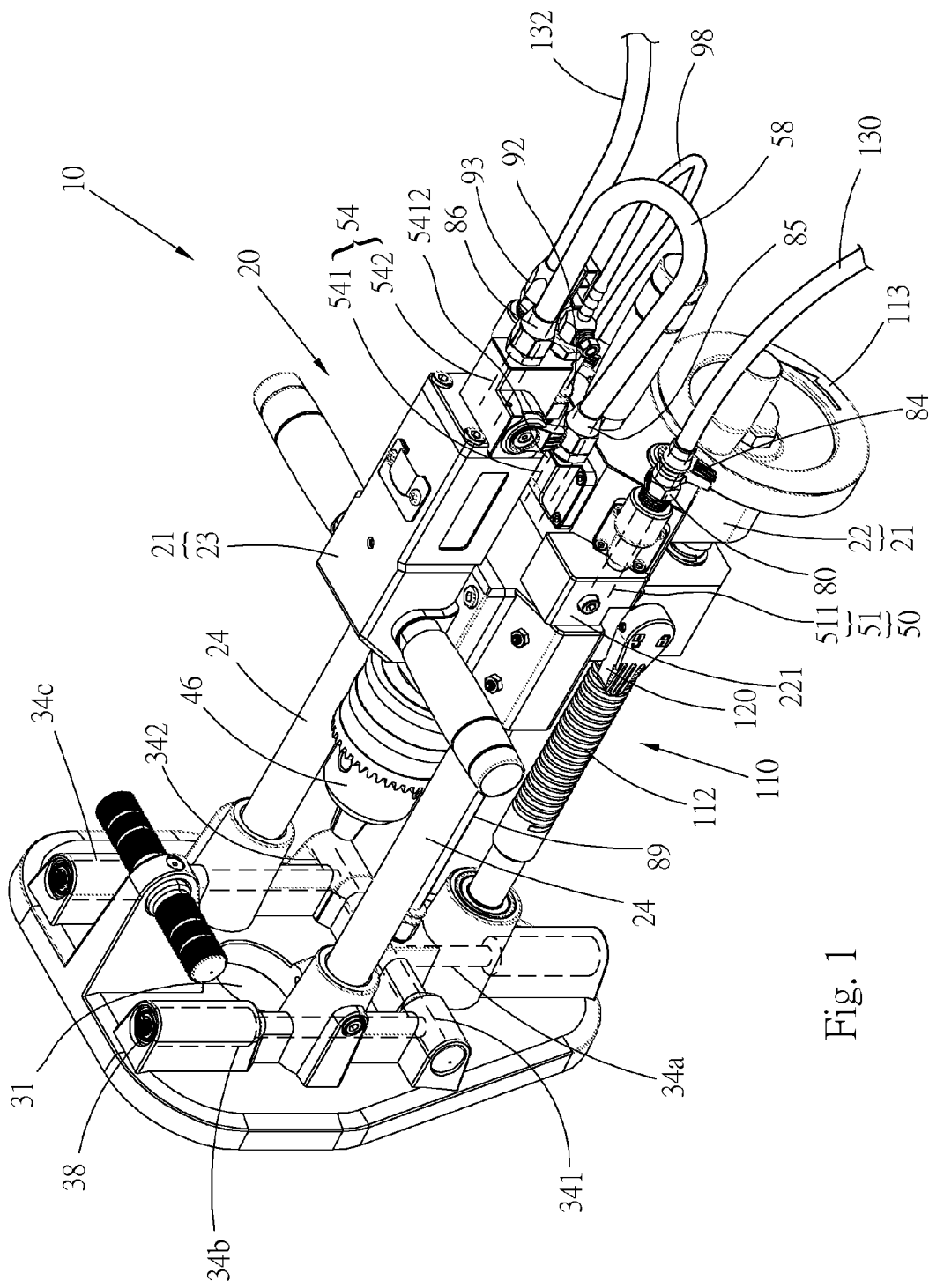
FIG. 1 is a left perspective view of a preferred embodiment of the pneumatic mechanism of the present invention.

Please refer to FIGS. 1 to 4. According to a first embodiment, the pneumatic mechanism 10 of the present invention is, but not limited to, a driller for illustration purposes only. Alternatively, the pneumatic mechanism 10 of the present invention can be any other pneumatic tool or pneumatic mechanism drivable by high-pressure air source. The pneumatic mechanism 10 includes a casing 20 having a main body 21 and a base seat 30 connected with each other, a drive mechanism 40 mounted in the main body 21 and several suckers 70 disposed on the base seat 30.

In this embodiment, the pneumatic mechanism is a driller. Therefore, the main body 21 is connected with the base seat 30 via at least one guide rail 24, for example, two guide rails. The two guide rails 24 serve to guide the main body 21 to move relative to the base seat 30. In different types of pneumatic mechanisms, the connection means between the main body and the base seat will be different. To speak more specifically, the main body 21 includes a main seat 22 and a slide seat 23. First ends of the two guide rails 24 are fixedly connected with the front end face of the base seat 30. Second ends of the two guide rails 24 are fixedly connected with a protrusion section 221 of the main seat 22 of the main body 21. The main seat 22 is spaced from the base seat 30 by a fixed distance. The two guide rails 24 respectively pass through two sides of the slide seat 23, whereby the slide seat 23 can slide along the guide rails.

Figure 5:
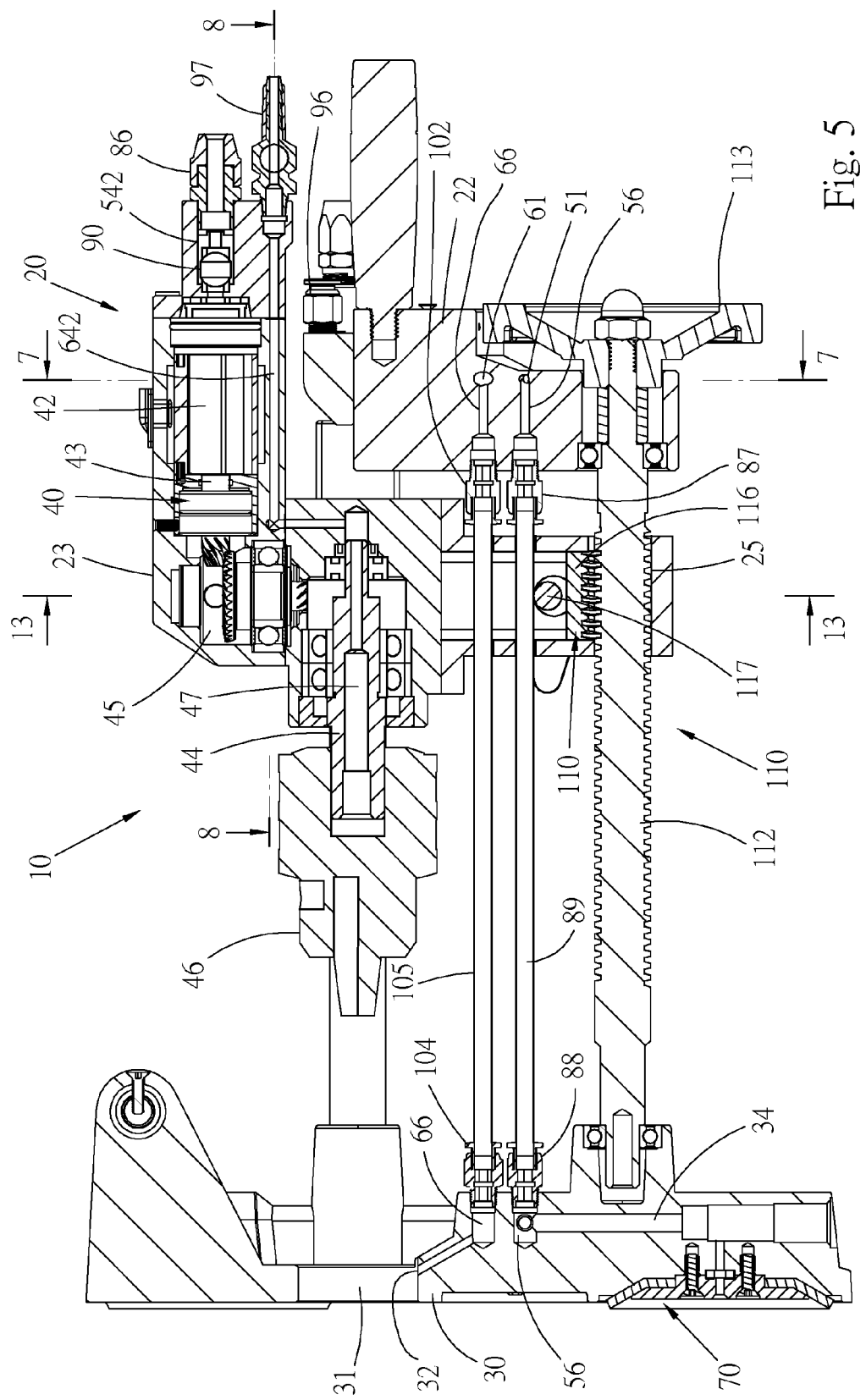
FIG. 5 is a longitudinal sectional view of the pneumatic mechanism of the present invention according to FIG. 1.

Please refer to FIG. 5. The drive mechanism 40 is disposed in the slide seat 23 of the main body 21. The drive mechanism 40 has a rotor 42 and a main shaft 44. The rotary shaft 43 of the rotor 42 serves to drive the main shaft 44 to rotate via a gear set 45. A working head, which is a holder 46, is disposed at one end of the main shaft 44 for holding a drill bit (not shown). A shaft hole 47 is formed through the main shaft 44 between two ends of the main shaft 44.

Figure 7:
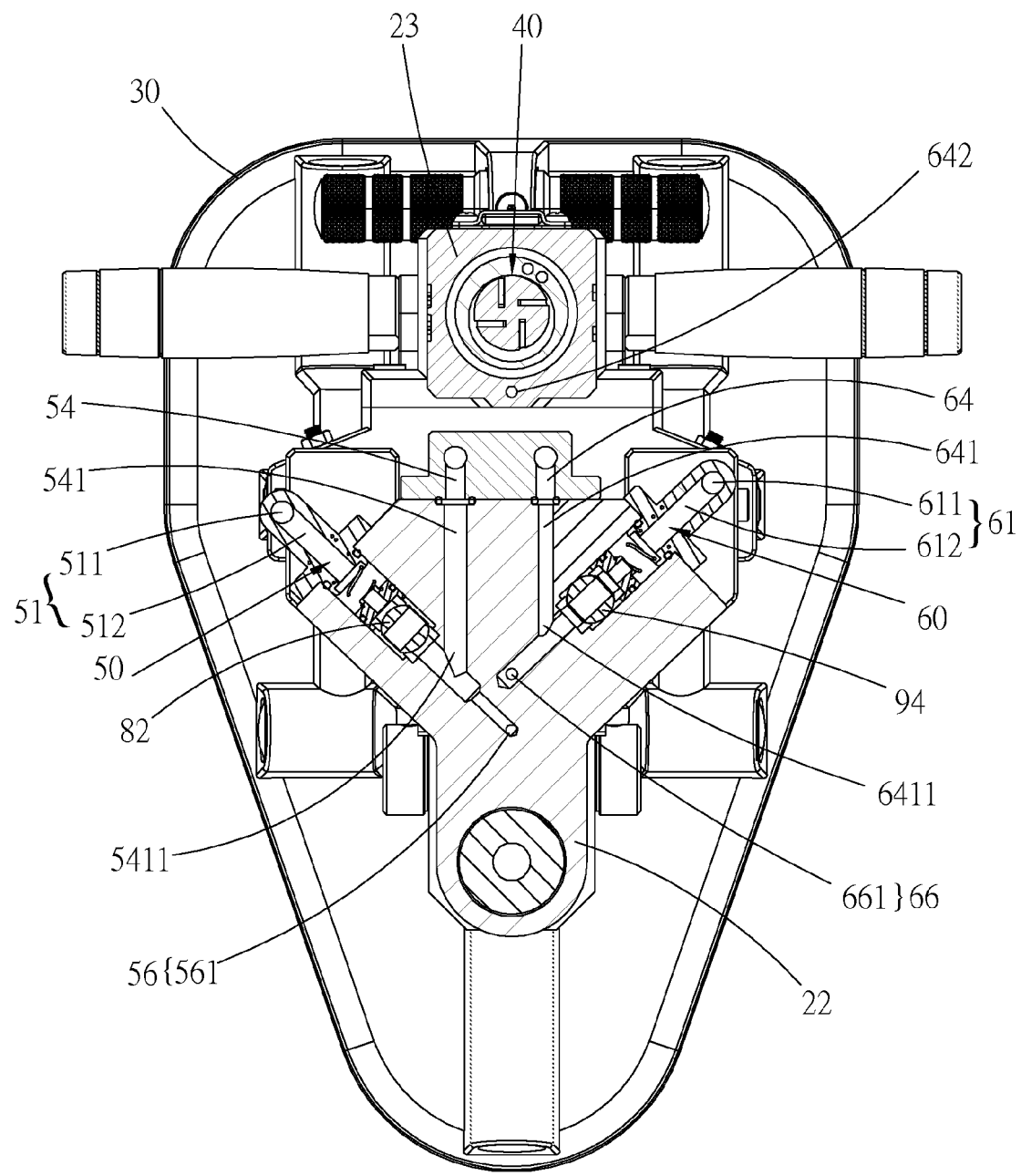
FIG. 7 is a sectional view taken along line 7-7 of FIG. 5.

Please refer to FIGS. 1 and 7. An intake passage 50 is formed in the main seat 22 of the main body 21. The intake passage 50 has a main passage 51 having a front section 511 and a rear section 512 in communication with each other. A main air connector 80 is disposed on the main seat 22 and connected with an inlet end of the main passage 51 of the intake passage 50. An intake valve 82 is disposed in the rear section 512 of the main passage 51 of the intake passage 50. An intake switch 84 is pivotally disposed on the main seat 22 and connected with the intake valve 82. When rotating the intake switch 84, the valve 82 is driven and rotated to close or open the intake passage 50.

Figure 6:
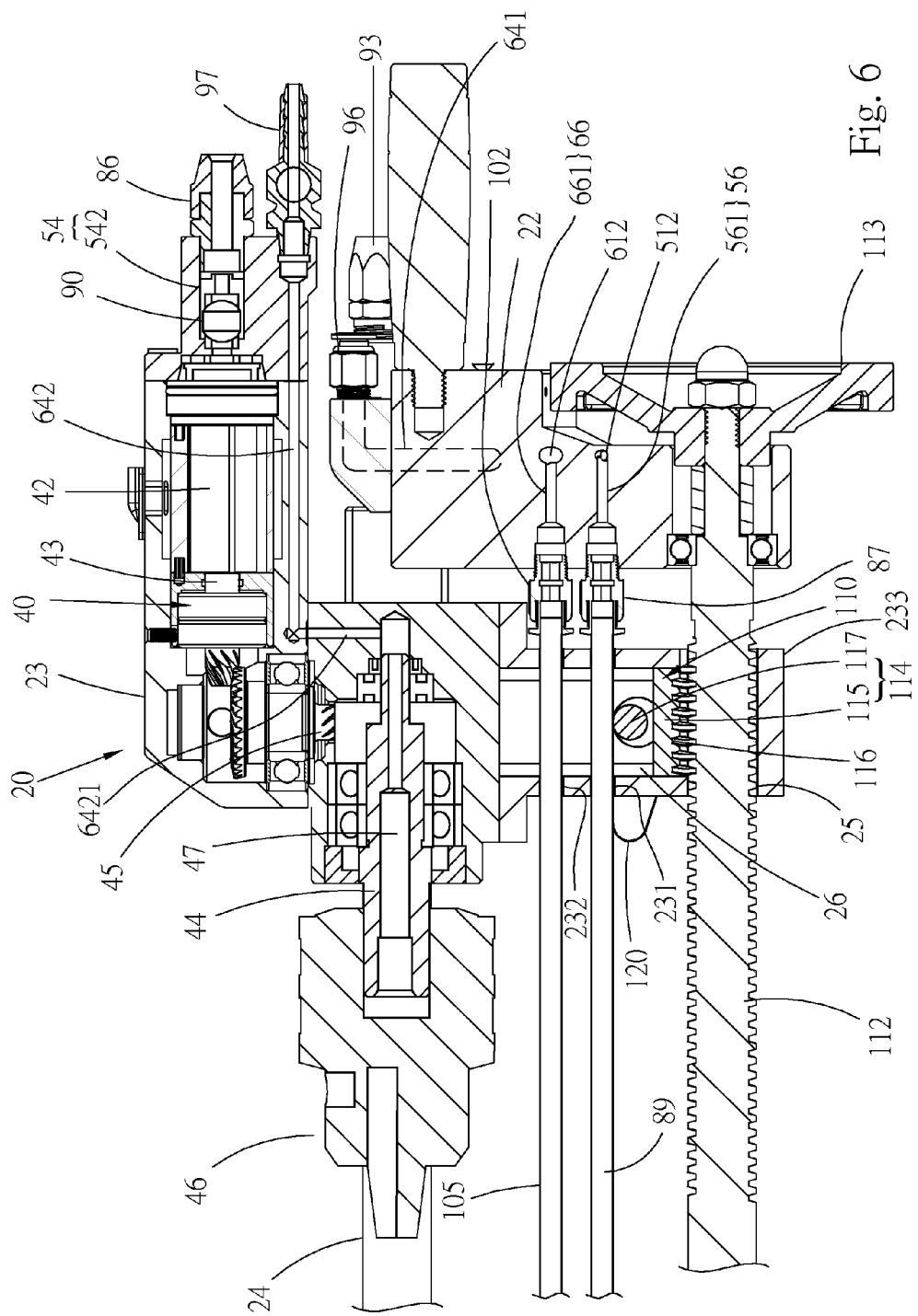
FIG. 6 is an enlarged view of a part of FIG. 5.

The intake passage 50 further includes a first air bypass 54 and a second air bypass 56. The first air bypass 54 has a front section 541 and a rear section 542 as shown in FIGS. 1, 6 and 7. The front section 541 is disposed in the main seat 22. A first end 5411 of the front section 541 communicates with the main passage 51, while a second end 5412 is positioned on the circumference of the main seat. The rear section 542 of the first air bypass 54 is disposed in the slide seat 23. An inner end of the rear section 542 communicates with an inlet (not shown) of the drive mechanism 40. A first connector 85 is disposed on the main seat 22 and connected with the front section 541 of the first air bypass 54. A second connector 86 is disposed on the slide seat 23 and connected with the rear section 542 of the bypass 54. A first connection pipe 58 is a rubber hose. Two ends of the first connection pipe 58 are respectively connected with the two connectors 85, 86, whereby the front and rear sections 541, 542 of the first air bypass 54 communicate with each other. Moreover, an activation valve 90 is disposed in the rear section 542 of the first air bypass 54. An activation switch 92 is pivotally disposed on the slide seat 23 and connected with the activation valve 90. The activation valve 90 is rotationally drivable by the activation switch 92 to close or open the first air bypass 54.

Figure 9:
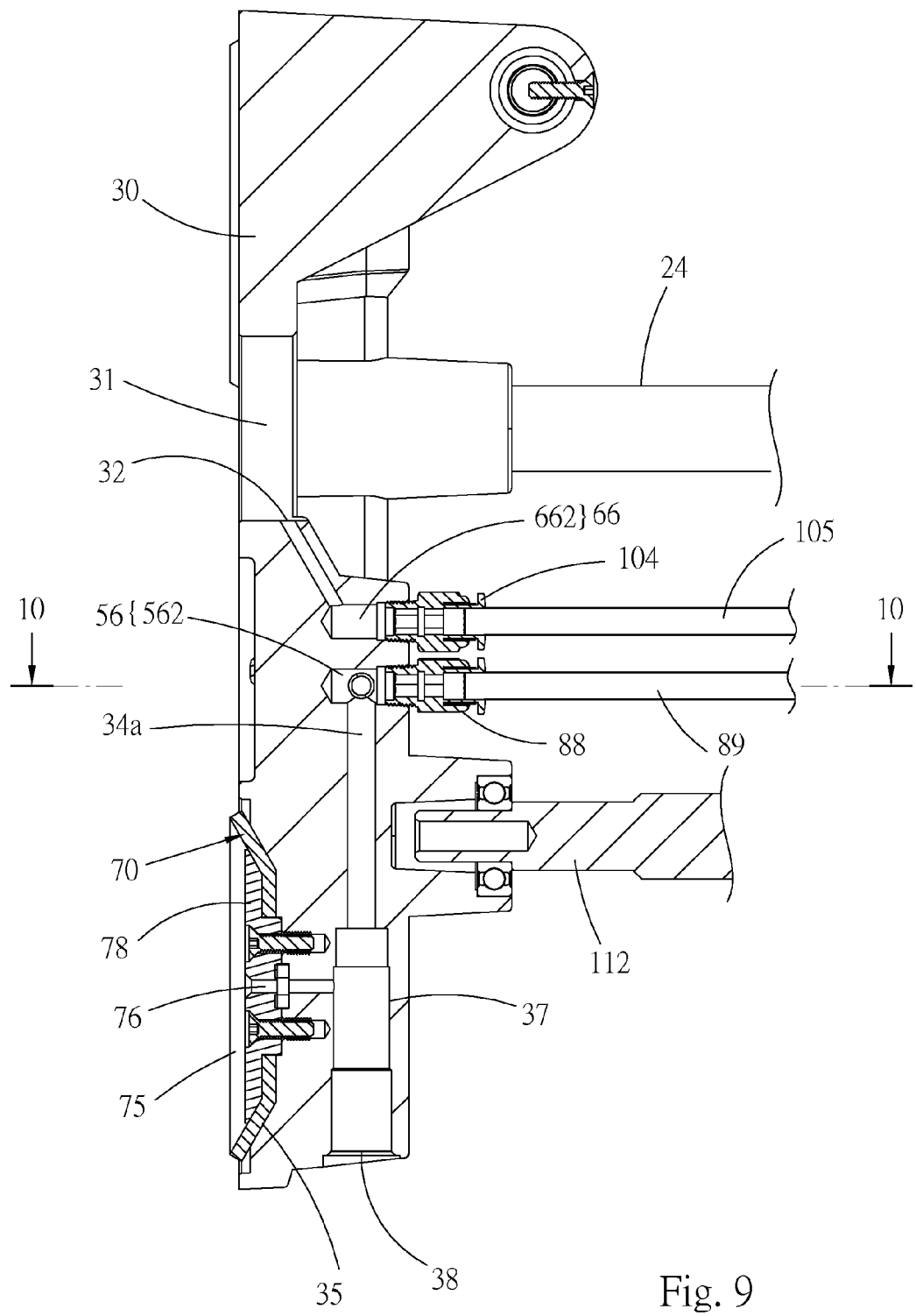
FIG. 9 is an enlarged view of another part of FIG. 5.

Please refer to FIGS. 5, 6 and 9. The second air bypass 56 also has a front section 561 and a rear section 562 as shown in FIGS. 1, 6 and 7. The front section 561 is disposed in the main seat 22. The rear section 562 is disposed in the base seat 30. A third connector 87 and a fourth connector 88 are respectively disposed on the main seat 22 and the base seat 30 in communication with the front and rear sections 561, 562. A first connection member 89, which is a hard tubular body, passes through a through hole 231 of the slide seat 23. Two ends of the first connection member 89 are respectively connected with the third and fourth connectors 87, 88 to communicate the front and rear sections 561, 562 of the second air bypass 56.

Figure 2:
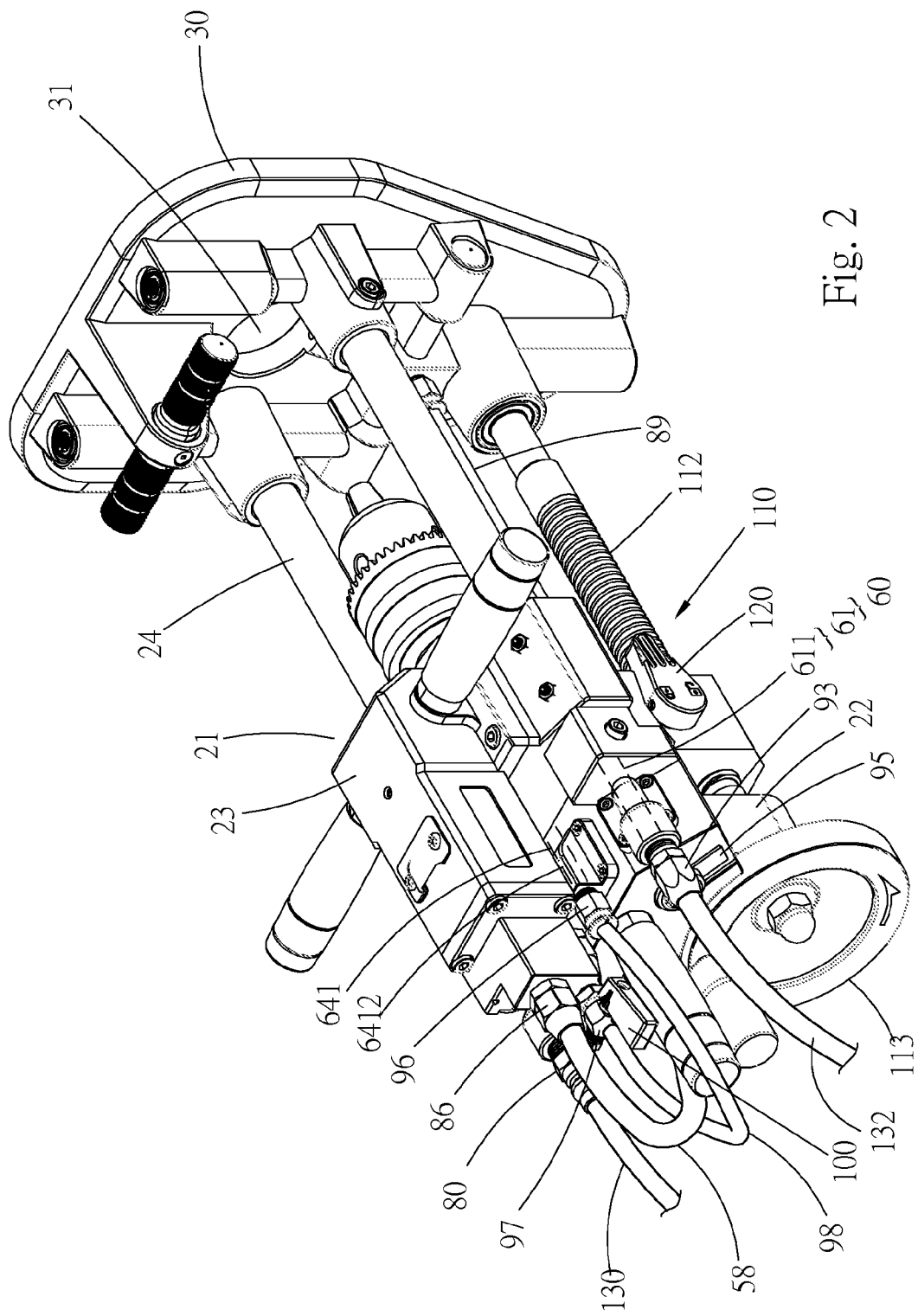
FIG. 2 is a right perspective view of the preferred embodiment of the pneumatic mechanism of the present invention.

Please refer to FIGS. 2 and 7. A fluid way 60 having a trunk way 61 disposed in the main seat 22 of the main body 21. The trunk way 61 has a front section 611 and a rear section 612 connected with each other. A main fluid connector 93 is disposed on the main seat 22 and connected with the inlet end of the trunk way 61 of the fluid way 60. A fluid valve 94 is disposed in the rear section 612 of the trunk way 61 of the fluid way 60 and controllable by a fluid switch 95. When rotating the fluid switch 95, the fluid valve 94 is driven and rotated to close or open the fluid way 60.

Figure 8:
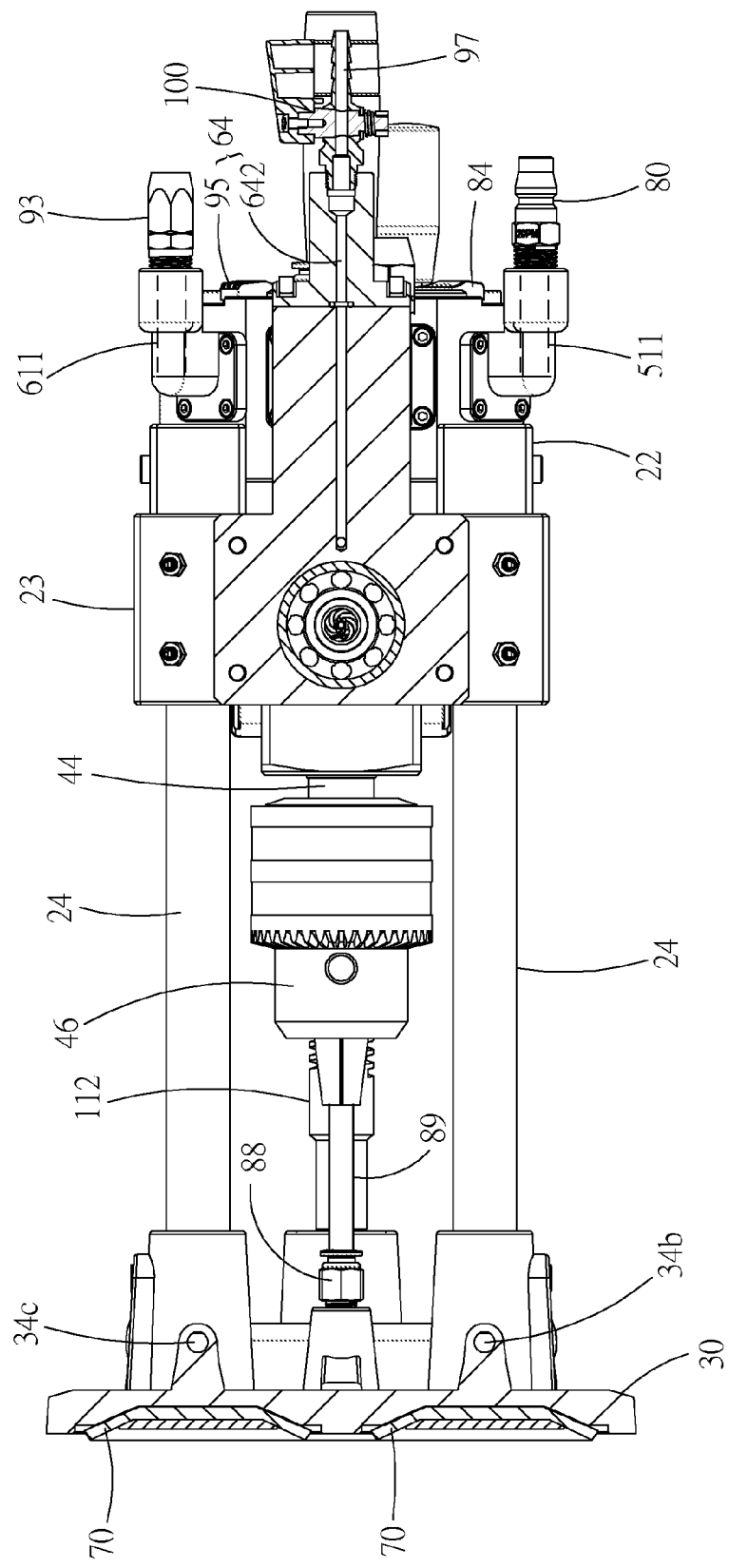
FIG. 8 is a sectional view taken along line 8-8 of FIG. 5.

The fluid way 60 also has a first fluid bypass 64 and a second fluid bypass 65. As shown in FIGS. 2, 6 and 7, the first fluid bypass 64 has a front section 641 and a rear section 642. The front section 641 is disposed in the main seat 22. A first end of the front section 641 communicates with the trunk way 61, while a second end 6412 is positioned on the circumference of the main seat. The rear section 642 of the first fluid bypass 64 is disposed in the slide seat 23. The rear end 6421 of the rear section 642 communicates with the shaft hole 47 of the main shaft 44 of the drive mechanism 40. A fifth connector 96 is disposed on the main seat 22 and connected with the front section 641 of the first fluid bypass 64. A sixth connector 97 is disposed on the slide seat 23 and connected with the rear section 642 of the bypass 64. A second connection pipe 98 is a rubber hose. Two ends of the second connection pipe 98 are respectively connected with the two connectors 96, 97, whereby the front and rear sections 641, 642 of the first fluid bypass 64 communicate with each other. A small fluid switch 100 is mounted in the rear section 642 of the first fluid bypass 64 or mounted in the sixth connector 97 as shown in FIG. 8 to open or close the first fluid bypass 64.

Please refer to FIGS. 5, 6 and 9. The second fluid bypass 66 also has a front section 661 and a rear section 662. The front section 661 is disposed in the main seat 22. The rear section 662 is disposed in the base seat 30. A seventh connector 102 and an eighth connector 104 are respectively disposed on the main seat 22 and the base seat 23 in communication with the front and rear sections 661, 662. A second connection member 105, which is a hard tubular body, passes through another through hole 232 of the slide seat 23. Two ends of the second connection member 105 are respectively connected with the seventh and eighth connectors 102, 104, whereby the front and rear sections 661, 662 of the second fluid bypass 66 communicate with each other.

The base seat 30 has a considerable area. A perforation 31 is formed on the base seat 30 in alignment with the holder 46 of the drive mechanism 40. The rear end of the rear section 662 of the second fluid bypass 66 extends to the circumference of the perforation 31 to form a water outlet 32 in communication with the perforation 31.

Figure 3:
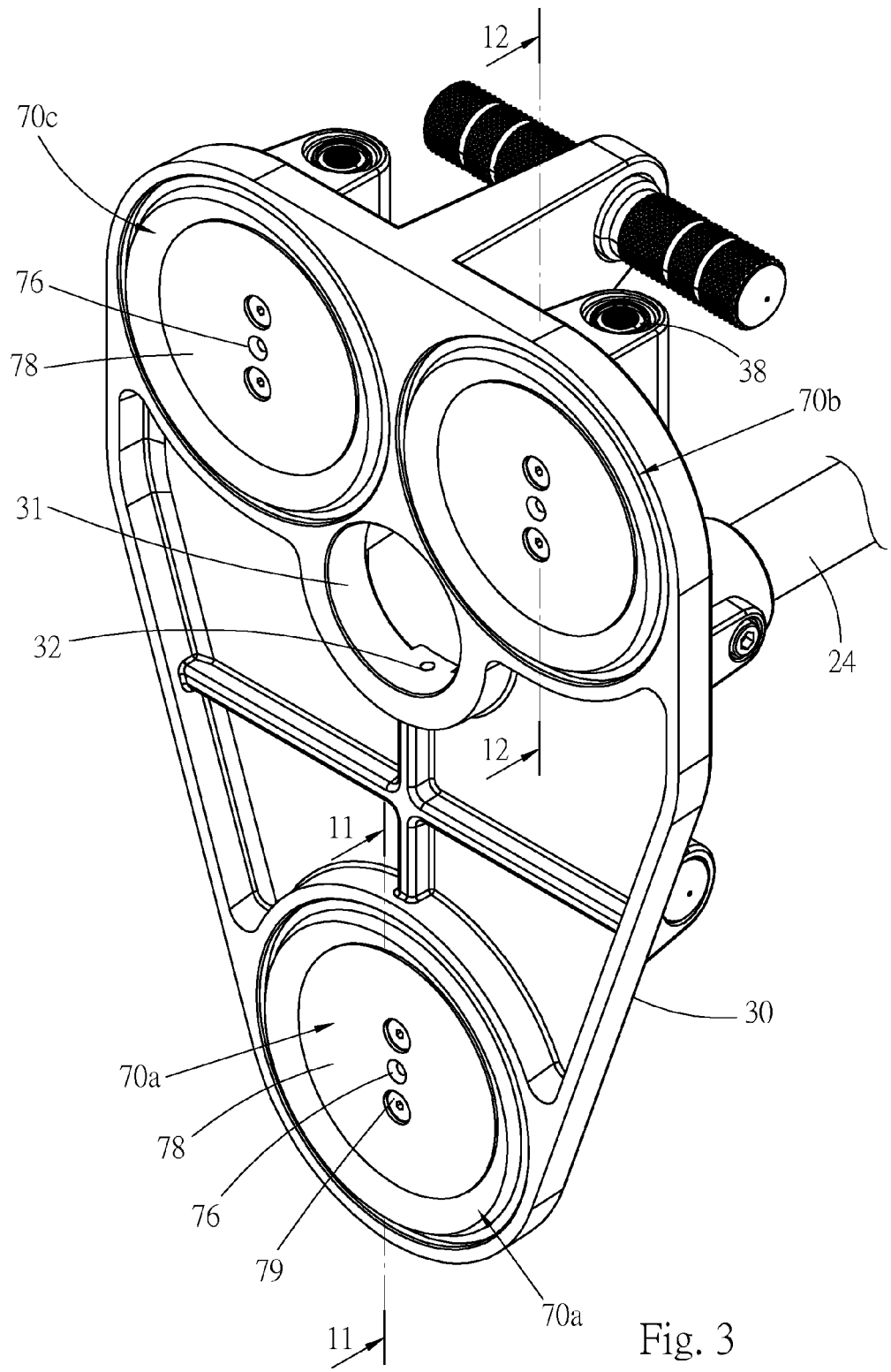
FIG. 3 is a rear perspective view of a part of the preferred embodiment of the pneumatic mechanism of the present invention.
Figure 4:
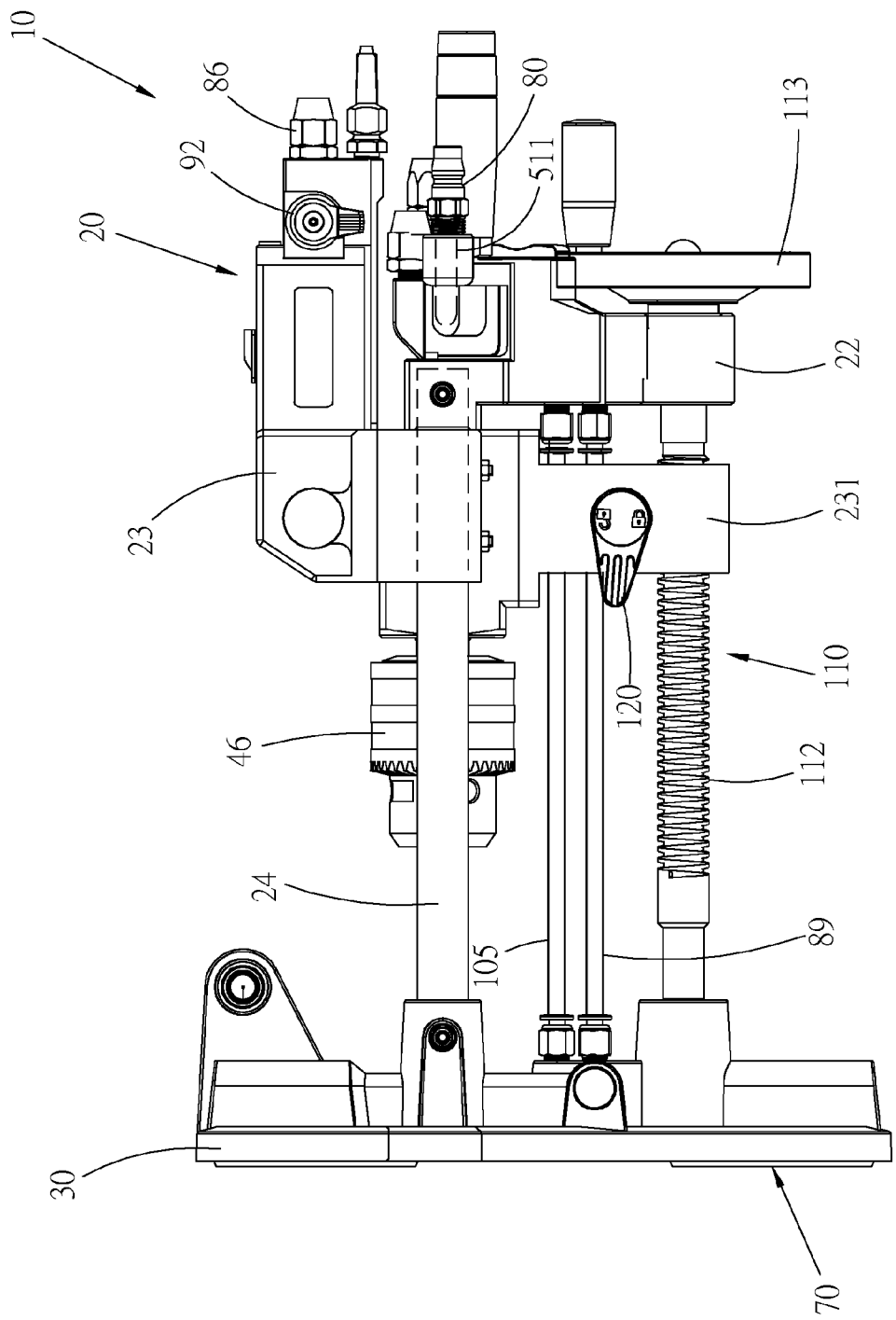
FIG. 4 is a side view according to FIG. 1.
Figure 10:
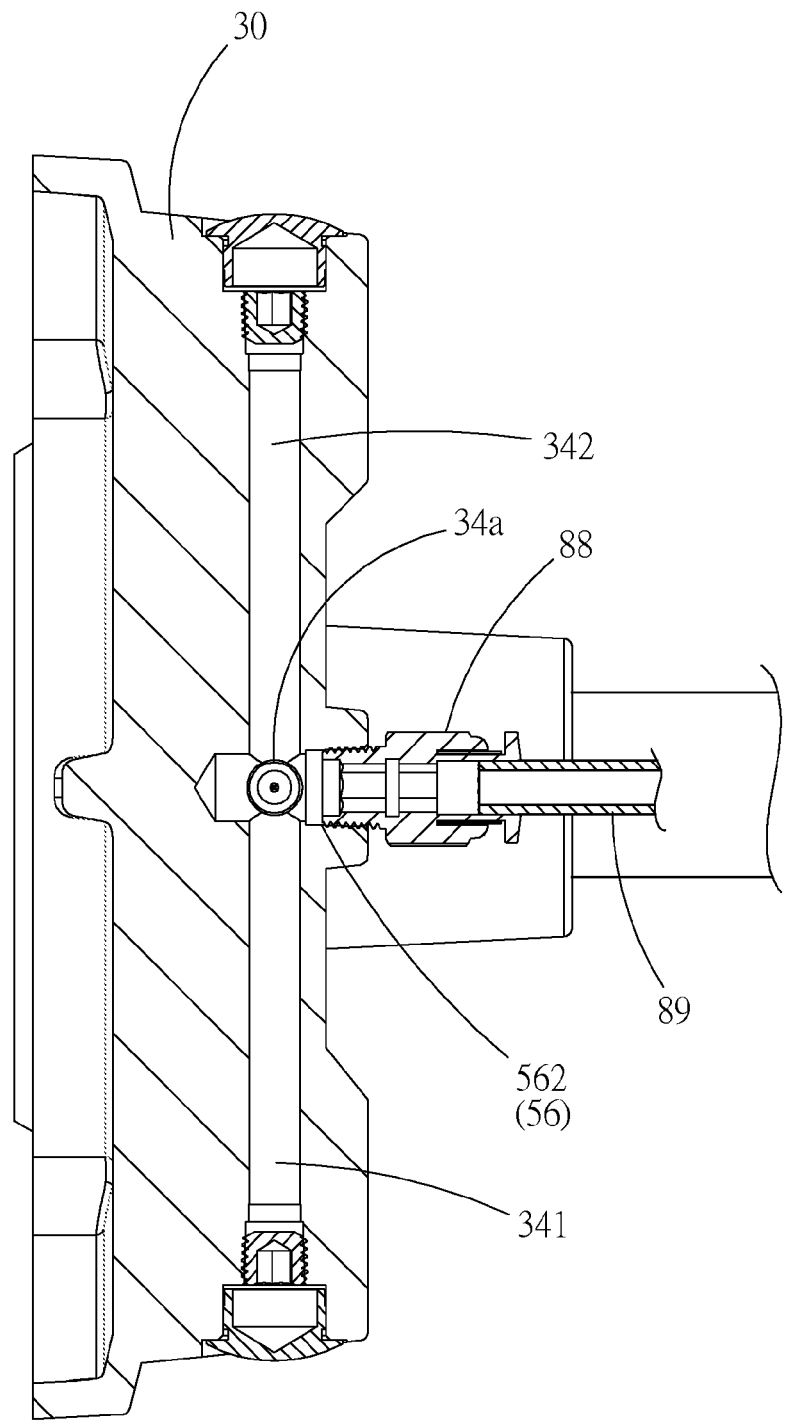
FIG. 10 is a sectional view taken along line 10-10 of FIG. 9.

One or more suckers 70 are disposed on the rear end face of the base seat 30 as shown in FIG. 3. Please refer to FIGS. 1, 9 and 10. At least one airflow passage 34 is disposed in the base seat 30 in communication with the rear section 562 of the second air bypass 56. In this embodiment, there are three suckers 70, therefore, there are three airflow passages 34a, 34b, 34c formed in the base seat in communication with the second air bypass 56. First ends of the airflow passages 34b, 34c via two bypasses 341, 342 communicate with the rear section 562 of the second air bypass 56. The rear end face of the base seat 30 is recessed to form three tapered or conic cavities 35 for receiving the three suckers 70.

Figure 11:
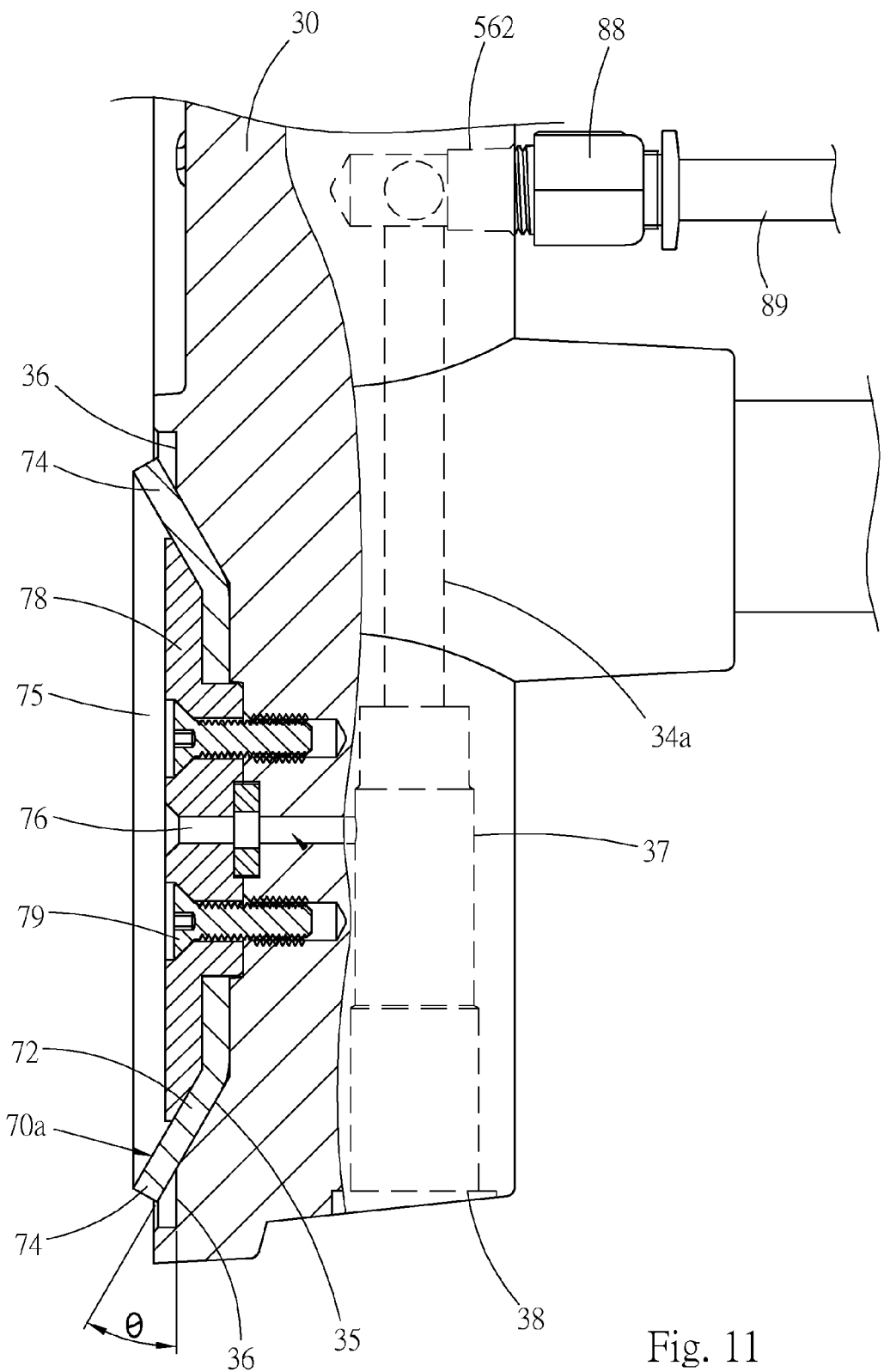
FIG. 11 is a sectional view taken along line 11-11 of FIG. 3.

Please refer to FIG. 11. With the installation structure of the sucker 70a taken as an example, the outer circumference of each cavity 35 has an annular abutment face 36. The annular abutment face 36 is preferably a plane face. The sucker 70*a* is a tray-shaped body made of flexible material such as rubber. The sucker 70*a* is mounted in the cavity 35. A disc-shaped fastening member 78 is screwed on the base seat 30 by means of one or more threaded members 79. The base seat 30, the sucker 70*a* and the fastening member 78 are connected with each other to forma sandwich structure, whereby the sucker is fastened in the cavity 35. The sucker 70*a* has a conic annular wall 72 formed on the circumference of the sucker 70*a*. The outer circumference of the annular wall 72 protrudes from the cavity 35. The protrusion section of the annular wall 72 forms a lip section 74 just positioned on outer side of the abutment face 36 without attaching to or contacting the abutment face 36, whereby the lip section 74 is freely flexible. The lip section 74 and the abutment face 36 contain therebetween an angle θ. The angle θ is smaller than 45 degrees and ranges from 20 degrees to 35 degrees, and is preferably 30 degrees. An air chamber 75 is formed in the sucker 70*a*. The annular wall 72 defines an inward recessed space as the air chamber 75. An air-sucking passage 76 is axially formed through the sucker. The air-sucking passage 76 is formed of the passages of the fastening member, the cavity and the sucker. The air-sucking passage 76 passes through the fastening member 78, the sucker 70*a* and the cavity 35. One end of the air-sucking passage 76 communicates with the air chamber 75 of the sucker, while the other end of the air-sucking passage 76 communicates with an airflow passage 34*a*.

Figure 12:
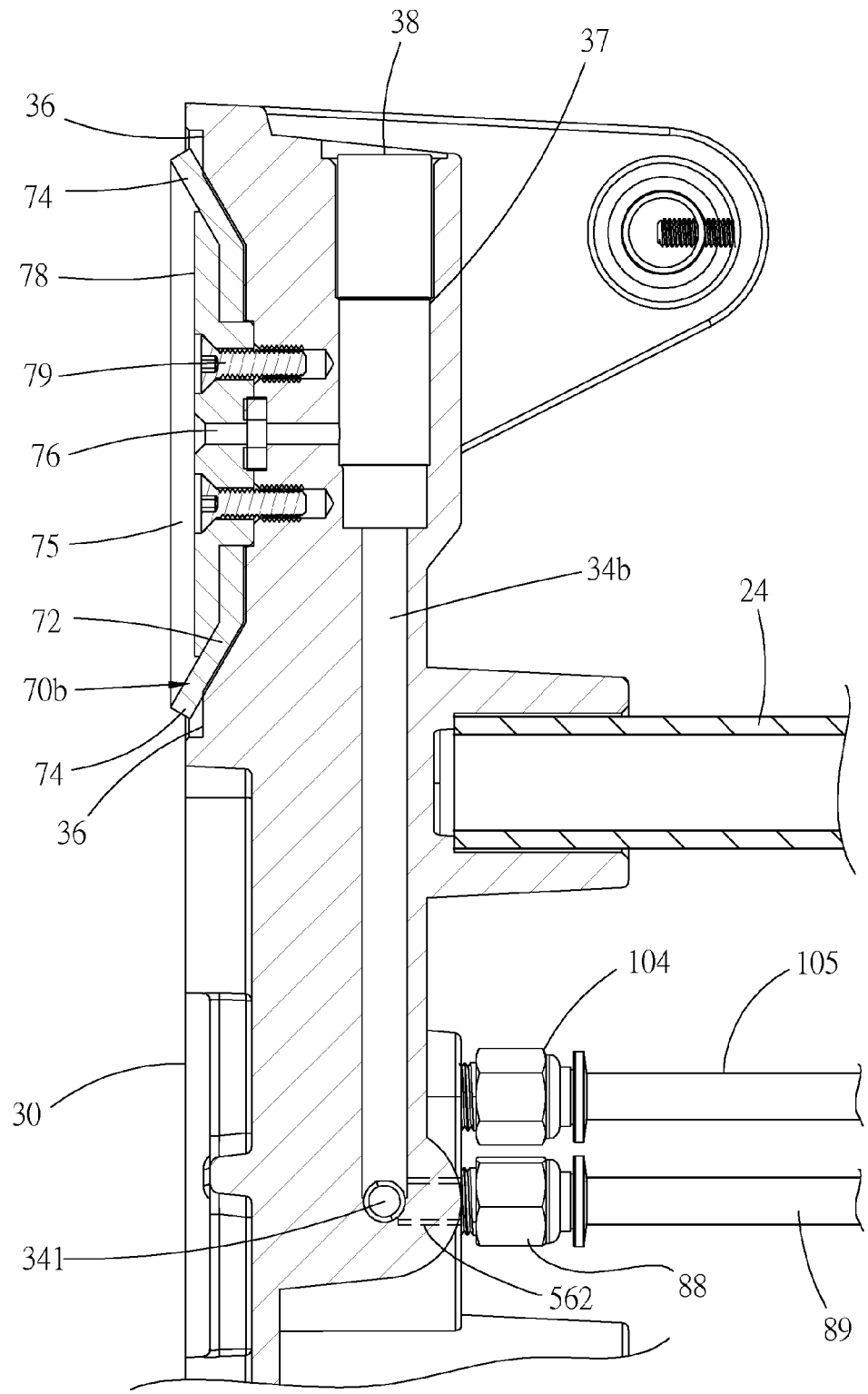
FIG. 12 is a sectional view taken along line 12-12 of FIG. 3.

The other two suckers 70*b*, 70*c* are identical to the above sucker 70*a* in structure and installation manner. Please refer to FIG. 12, with the sucker 70*b* taken as an example and the same components denoted with the same reference numerals, the sucker 70*b* is also mounted in another cavity of the base seat 30 via a fastening member 78. One end of an air-sucking passage 76 communicates with the air chamber 75 of the sucker 70*b*. The other end of the air-sucking passage 76 communicates with another airflow passage 34*b*. Accordingly, one end of the air-sucking passage 76 of each of the three suckers 70 communicates with an airflow passage 34.

Please refer to FIGS. 1, 5, 6 and 13. The pneumatic mechanism further includes a feeding mechanism 110 including a threaded rod 112 and a clutch member 114. The protrusion section 233 of the slide seat 23 is formed with a through hole 25 and a room 26 in communication with each other. The through hole 25 passes through the slide seat between the front end face and rear end face. The axial direction of the through hole 25 is parallel to the two guide rails 24. The room 26 is positioned on one side of the through hole 25, for example, upper side of the through hole 25. The threaded rod 112 passes through the through hole 25. Two ends of the threaded rod 112 are respectively pivotally connected with the base seat 30 and the main seat 22. A rotary wheel 113 is connected with one end of the threaded rod 112 for rotating the threaded rod. The clutch member 114 includes an engagement member 115 and a control rod 117. The engagement member 115 is mounted in the room 26 and movable toward or away from the threaded rod 112. An engagement section 116 is disposed on a surface of the engagement member 115 and directed to the threaded rod. Two elastic members 119 are disposed in the room 26 in elastic abutment with the engagement member 115 to make the engagement member 115 disengaged from the threaded rod 112. The control rod 117 has an eccentric cam section 118. Two ends of the control rod 117 pass through two sidewalls of the slide seat 23 and rotatable. The cam section 118 is positioned in the room 26 and contactable with the engagement member 115. Two switch buttons 120 are respectively disposed at two ends of the control rod 117. An operator can rotate the control rod via either switch button 120.

Please refer to FIGS. 1 and 2. In use of the pneumatic mechanism, a high-pressure air tube body 130 is connected to the main air connector 80. A fluid (such as water or lubricant) tube body 132 is connected to the main fluid connector 93. After the intake valve 82 is opened, the high-pressure air is divided into two streams from the main passage 51 of the intake passage 50. One stream flows to the first air bypass 54, while the other stream flows to the second air bypass 56 and flows through the front section 561 of the bypass 56, the first connection member 89 and the rear section 562 into the three airflow passages 34 of the base seat 30, whereby the three suckers 70 produce sucking force.

Figure 14:
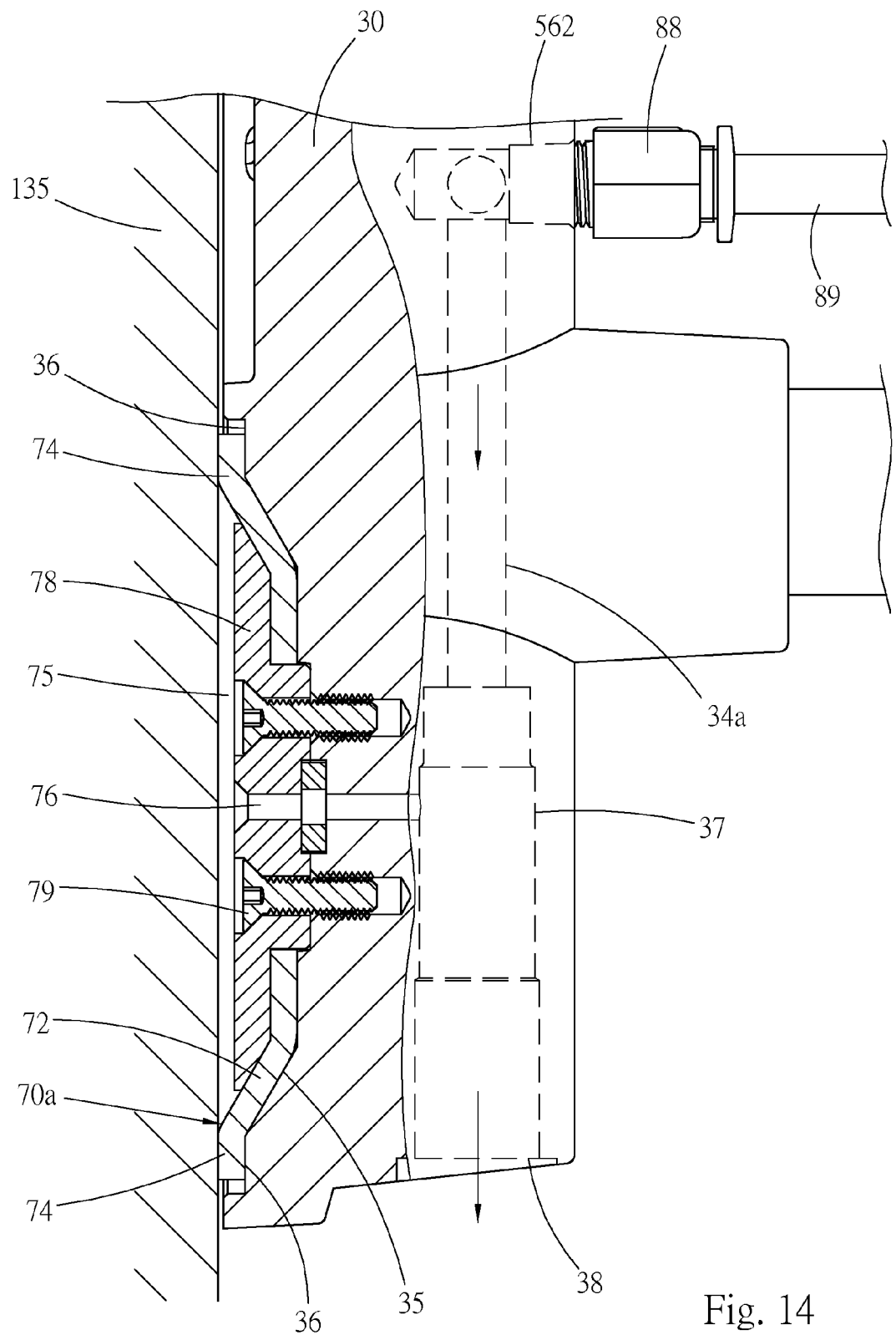
FIG. 14 is a sectional view according to FIG. 11, showing that the base seat sucks a plane face.

According to Bernoulli's principle that an increase in the speed of the fluid occurs simultaneously with a decrease in pressure, the suckers of the present invention produce sucking force. Please refer to FIG. 14. With the sucker 70*a* taken as an example, a fast flow section 37 is provided in each airflow passage 34. A nozzle (not shown) is disposed in the fast flow section 37 to make the air flow fast. One end of the air-sucking passage 76 of the sucker 70 is just in communication with the fast flow section 37. The high-pressure air flows through the fast flow section to form a fast airflow with lower pressure. Relative to the fast airflow, the airflow in the air chamber 75 and the air-sucking passage 76 has a lower speed and higher pressure. Under the effect of pressure difference, the air in the air chamber 75 and the air-sucking passage 76 will flow to the airflow passage 34*a*. As a result, a negative pressure (lower than atmospheric pressure) is created in the air-sucking passage 76 and the air chamber 75 so that the sucker 70 produces a sucking force to suck a surface 135 of an object.

When the sucker 70 produces the sucking force, the lip section 74 snugly attaches to the surface 135 of the object. Therefore, the entire sucker 70 is moved to get closer to the surface. Under the sucking force, the lip section 74 is flexed from an inclined state to a horizontal state. The inner surface of the lip section 74 is snugly attached to the annular abutment face 36 of the base seat 30, while the outer surface of the lip section 74 is snugly attached to the surface 135, whereby the air chamber 75 becomes a closed space isolated from outer side. The air in the air chamber 75 is sucked from the air-sucking passage 76 into the airflow passage 34 and then exhausted from the outlet end 38 of the airflow passage 34 along with the fast airflow.

When the sucker 70 sucks a surface 135, due to the sucking force, the air chamber 75 forms a negative pressure space in which the air pressure is smaller than the atmospheric pressure. The high-speed airflow continuously flows through the airflow passage so that the sucking force of the sucker can be maintained to keep the air chamber 75 in a negative pressure state. Accordingly, all the three suckers 70 can produce sucking force, whereby the pneumatic mechanism 10 can suck the surface 135 without dropping. Through the applicant's test, it is found that each sucker 70 of the present invention with a diameter of about 8 cm can suck an object with a weight over 10 kg. Therefore, the three suckers can securely affix the pneumatic mechanism 10 to the surface 135.

Figure 15:
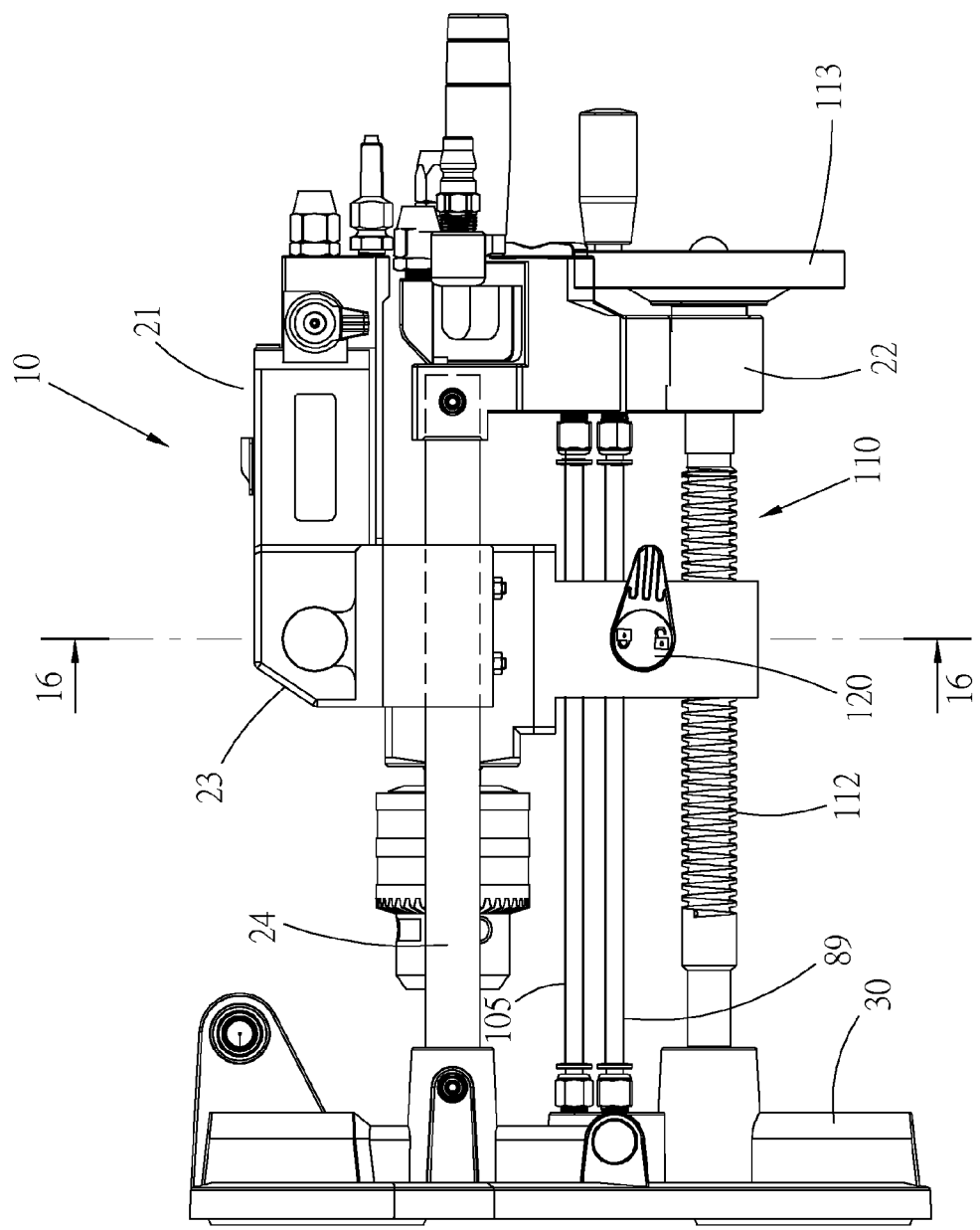
FIG. 15 is a side view of the pneumatic mechanism of the present invention, showing that the slide seat of the pneumatic mechanism is moved toward the base seat.

When the high-pressure air flows to the first air bypass 54, the activation valve 90 is opened, permitting the high-pressure air to flow into the drive mechanism 40 to urge the rotor 42 to drive and rotate the main shaft 44 and the holder 46. At this time, the slide seat 23 is moved toward the base seat 30 as shown in FIG. 15. Under such circumstance, the drill bit (not shown) on the holder 46 can pass through the through hole 31 of the base seat for drilling operation.

Figure 13:
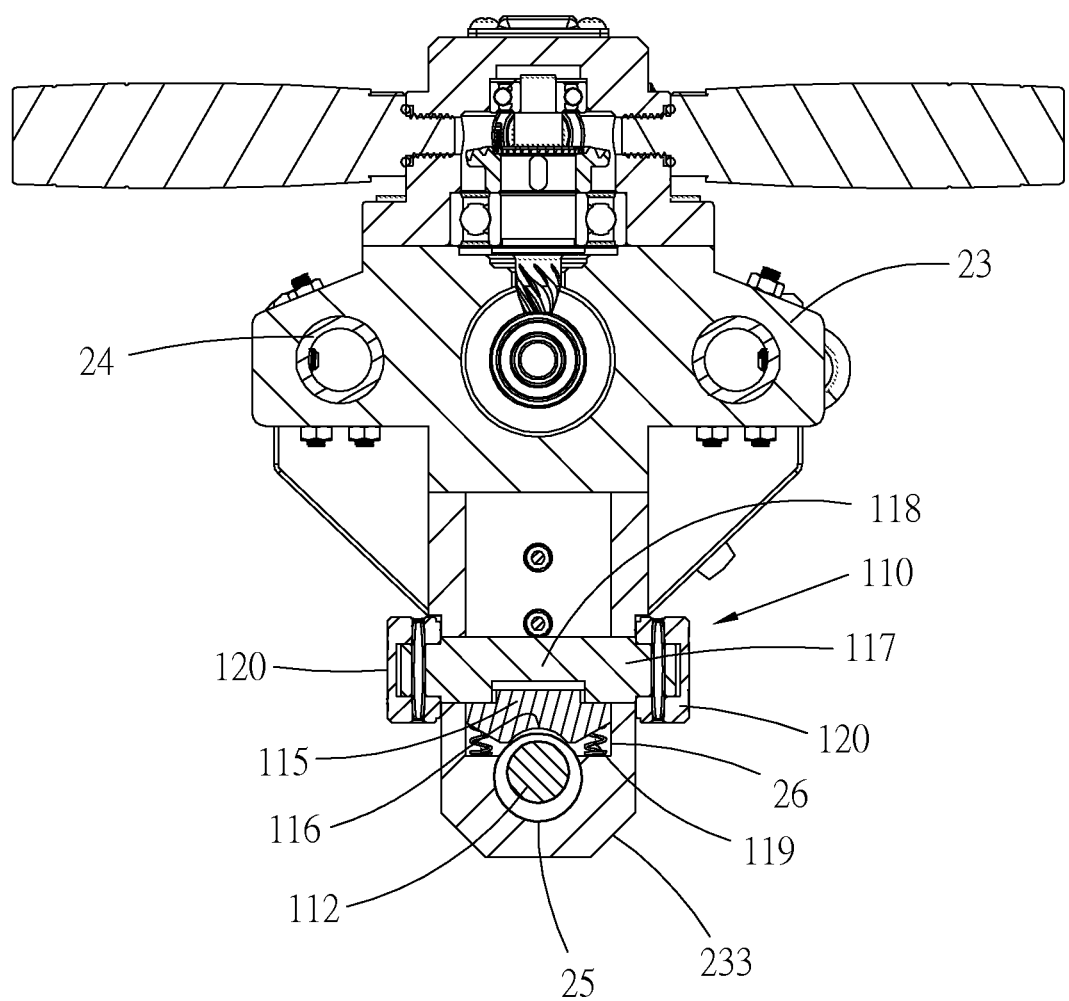
FIG. 13 is a sectional view taken along line 13-13 of FIG. 5.

In the state of FIGS. 6 and 13, the switch button 120 and the control rod 117 are positioned in a releasing position. At this time, the cam section 118 of the control rod does not push the engagement member 115 so that the engagement member 115 is disengaged from the threaded rod 112, whereby the operator can quickly move the slide seat 23.

Figure 16:
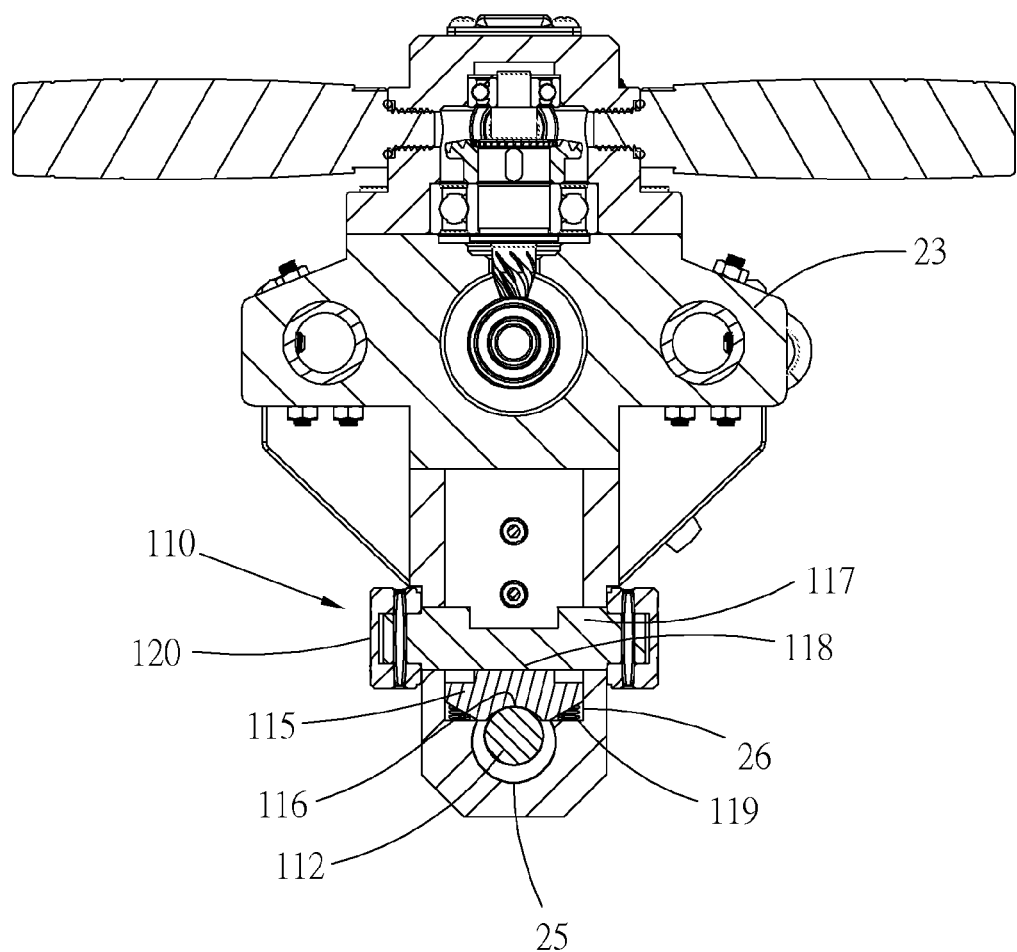
FIG. 16 is a sectional view taken along line 16-16 of FIG. 15.

Please refer to FIGS. 15 and 16. When the operator rotates the control rod 117 to an engaged position via either switch button 120, the cam section 118 pushes the engagement member 115 to move toward the threaded rod 112, whereby the engagement section 116 is engaged with the threaded rod 112. When the feeding mechanism 110 is in the engaged state, the operator can operate the rotary wheel 113 to rotate the threaded rod 112 to drive and move the slide seat 23 for drilling operation.

The pneumatic mechanism of the present invention has lubrication and cooling effect. When the fluid valve 94 is opened, the liquid can flow into the trunk way 61 of the fluid way 60. Then the liquid is divided into two streams flowing to the first fluid bypass 64 and the second fluid bypass 66 respectively. The fluid flowing into the second fluid bypass 66 flows from the second connection member 105 into the base seat 30 and flows out from the water outlet 32 for lubricating and cooling the drilled section and wetting the powders. In addition, when the operator opens the small fluid switch 100, the fluid can flow from the first fluid bypass 64 into the shaft hole 47 of the main shaft 44 of the drive mechanism 40 and then flow out from the holder 46 to provide lubrication and cooling effect.

When the airflow in the airflow passage 34 is stopped or interrupted by a user, the surface is released from the sucking force of the suckers 70. In this embodiment, the sucker can provide very good sucking force with a small volume of high-pressure air.

The present invention is inventive in that the high-pressure air source serves as the only power source for powering the pneumatic mechanism and producing sucking force to suck a surface. It is unnecessary for the operator to consume strength for supporting the weight of the pneumatic mechanism. Therefore, the pneumatic mechanism can be more stably and securely operated.

Moreover, the high-pressure air source serves as the power source of the pneumatic mechanism of the present invention. Therefore, the danger of shock can be avoided. Furthermore, the pneumatic mechanism of the present invention can provide liquid lubrication, cooling and powder wetting effect.

The above embodiments are only used to illustrate the present invention, not intended to limit the scope thereof. Many modifications of the above embodiments can be made without departing from the spirit of the present invention.

What is claimed is:

1. A pneumatic mechanism comprising:
    a casing having a main body and a base seat;
    a drive mechanism disposed in the main body;
    a first air bypass and a second air bypass disposed in the main body, a rear end of the first air bypass communicating with the drive mechanism, a rear end of the second air bypass being positioned on the base seat;
    at least one airflow passage disposed on the base seat, one end of the airflow passage communicating with the second air bypass;
    at least one sucker disposed on an end face of the base seat, the sucker having an annular wall defining an air chamber; and
    at least one air-sucking passage disposed between the base seat and the sucker, one end of the air-sucking passage communicating with the air chamber of the sucker, the other end of the air-sucking passage communicating with the airflow passage;
    wherein at least one guide rail is connected between the main body and the base seat, the at least one guide rail serving to guide the main body to move relative to the base seat.

2. The pneumatic mechanism as claimed in claim 1, wherein:
    the main body includes a main seat and a slide seat and the at least one guide rail, one end of the at least one guide rail being securely connected with the base seat, the other end of the at least one guide rail being securely connected with the main seat; the at least on guide rail passing through the slide seat, whereby the slide seat is slidable along the at least one guide rail;
    the drive mechanism being disposed in the slide seat; and
    the first air bypass having a front section and a rear section in communication with each other, the front section being disposed in the main seat, the rear section being disposed in the slide seat, a rear end of the rear section communicating with the drive mechanism.

3. The pneumatic mechanism as claimed in claim 1, wherein:
    the main body is spaced from the base seat by a certain distance;
    the second air bypass having a front section and a rear section, the front section being disposed in the main body, the rear section being disposed in the base seat; and further comprising:
    a first connection member, two ends of the first connection member being respectively connected with the front and rear sections of the first second air bypass.

4. The pneumatic mechanism as claimed in claim 3, wherein:
    the main body includes a main seat and a slide seat and the at least one guide rail, one end of the at least one guide rail being securely connected with the base seat, the other end of the at least one guide rail being securely connected with the main seat, the at least one guide rail passing through the slide seat, whereby the slide seat is slidable along the at least one guide rail;
    the drive mechanism being disposed in the slide seat;
    the first air bypass having a front section and a rear section, the front section being disposed in the main seat, the rear section being disposed in the slide seat, a rear end of the rear section communicating with the drive mechanism; and further comprising:
    a connection pipe, two ends of the connection pipe being respectively connected with the front and rear sections of the first air bypass.

5. The pneumatic mechanism as claimed in claim 1, wherein the drive mechanism has a main shaft formed with a shaft hole, further comprising at least one fluid way disposed in the main body, a rear end of the fluid way communicating with the shaft hole of the main shaft of the drive mechanism.

6. The pneumatic mechanism as claimed in claim 1, further comprising at least one fluid bypass disposed in the main body, a rear end of the fluid bypass being positioned on the base seat.

7. The pneumatic mechanism as claimed in claim 1, wherein at least one cavity is disposed on an end face of the base seat, an outer circumference of the cavity having an annular abutment face, the sucker being disposed in the cavity, an outer circumference of the sucker protruding from the cavity, the protrusion section of the sucker forming a lip section just positioned on an outer side of the abutment face without contacting the abutment face when the lip section is in a normal state, whereby the lip section is freely flexible, the air-sucking passage being axially formed through the sucker to pass through the sucker and the cavity.

8. The pneumatic mechanism as claimed in claim 2, wherein the drive mechanism has a working head, a perforation being formed on the base seat in alignment with the working head.

9. The pneumatic mechanism as claimed in claim 5, wherein the drive mechanism has a working head, a perforation being formed on the base seat in alignment with the working head.

10. The pneumatic mechanism as claimed in claim 8, wherein at least one fluid bypass is disposed in the main body, a rear end of the fluid bypass being positioned on the base seat in communication with the perforation to form a water outlet.

11. The pneumatic mechanism as claimed in claim 9, wherein at least one fluid bypass is disposed in the main body, a rear end of the fluid bypass being positioned on the base seat in communication with the perforation to form a water outlet.

12. The pneumatic mechanism as claimed in claim 1, wherein:
  the drive mechanism has a main shaft formed with a shaft hole; further comprising:
  a first fluid bypass and a second fluid bypass, the two fluid bypasses being disposed in the main seat, a rear end of the first fluid bypass communicating with the shaft hole of the main shaft; a rear end of the second fluid bypass being positioned on the base seat.

13. The pneumatic mechanism as claimed in claim 2, further comprising a feeding mechanism including a threaded rod and a clutch member, the threaded rod passing through the slide seat, two ends of the threaded rod being respectively pivotally connected with the base seat and the main seat, whereby the threaded rod is rotatable, the clutch member having an engagement member disposed in the slide seat, the clutch member being movable between an engaged position and a releasing position, when the clutch member is positioned in the engaged position, the engagement member being engaged with the threaded rod, when the clutch member is positioned in the releasing position, the engagement member being disengaged from the threaded rod.

14. The pneumatic mechanism as claimed in claim 13, wherein the slide seat is formed with a through hole and a room in communication with the through hole, the threaded rod passing through the through hole, the engagement member being movably disposed in the room, further comprising a control rod having a cam section, the control rod being pivotally disposed on the slide seat and movable between the engaged position and the releasing position, the cam section being positioned in the room, whereby when the control rod is positioned in the engaged position, the cam section pushes the engagement member to engage with the threaded rod, and when the control rod is positioned in the releasing position, the cam section does not push the engagement member, at least one elastic member being disposed in the room for elastically making the engagement member disengaged from the threaded rod.

15. The pneumatic mechanism as claimed in claim 1, wherein a main passage is disposed in the main body, the main passage having an inlet end positioned on a circumference of the main body, first ends of the first and second air bypasses communicating with the main passage.

16. The pneumatic mechanism as claimed in claim 3, further comprising:
  at least one fluid bypass having a front section and a rear section, the front section being disposed in the main body, the rear section being disposed in the base seat, and
  a second connection member, two ends of the second connection member being respectively connected with the front and rear sections of the fluid bypass.

\* \* \* \* \*